(12) United States Patent
Li et al.

(10) Patent No.: US 11,228,471 B2
(45) Date of Patent: Jan. 18, 2022

(54) MATCHED-FILTER RADIO RECEIVER

(71) Applicant: Nordic Semiconductor ASA, Trondheim (NO)

(72) Inventors: Wei Li, Trondheim (NO); Daniel Ryan, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 16/957,946

(22) PCT Filed: Jan. 3, 2019

(86) PCT No.: PCT/EP2019/050119
§ 371 (c)(1),
(2) Date: Jun. 25, 2020

(87) PCT Pub. No.: WO2019/134947
PCT Pub. Date: Jul. 11, 2019

(65) Prior Publication Data
US 2020/0351132 A1   Nov. 5, 2020

(30) Foreign Application Priority Data
Jan. 4, 2018   (GB) ..................... 1800101

(51) Int. Cl.
*H04L 27/00* (2006.01)
*H04L 27/233* (2006.01)
(Continued)

(52) U.S. Cl.
CPC ......... *H04L 27/2334* (2013.01); *H04B 1/123* (2013.01); *H04L 27/0008* (2013.01);
(Continued)

(58) Field of Classification Search
CPC ......... H04L 27/2334; H04L 2027/0085; H04L 27/0008; H04L 27/06; H04L 27/233; H04L 27/2331; H04L 2027/0026
(Continued)

(56) References Cited

U.S. PATENT DOCUMENTS 5,414,428 A * 5/1995 Gallagher ............. G01S 13/284
342/111
5,838,732 A * 11/1998 Carney ............... H04L 27/2621
375/297

(Continued)

FOREIGN PATENT DOCUMENTS

CN   1427594 A    7/2003
CN   101238454 A  8/2008
(Continued)

OTHER PUBLICATIONS

IPO Search Report under Section 17(5) for GB 1800101.6, dated Jun. 21, 2018, 3 pages.
(Continued)

*Primary Examiner* — Emmanuel Bayard
(74) *Attorney, Agent, or Firm* — Klarquist Sparkman, LLP

(57) ABSTRACT

A digital radio receiver has a matched filter bank of filter modules for receiving phase- or frequency-modulated radio signals. Each module cross-correlates a sampled signal with a respective multi-symbol filter sequence, using a plurality of samples in each symbol period. The matched filter bank calculates first values ($z_n(1)$), for respective symbol periods, of a cross-correlation of the sampled signal with a first complex exponential function defined at sample points over one symbol period, and calculates second values ($z_n(-1)$), for the respective symbol periods, of a cross-correlation of the sampled signal with a second, different, complex exponential function. A set of the filter modules cross-correlates (Continued)

Figure 1:
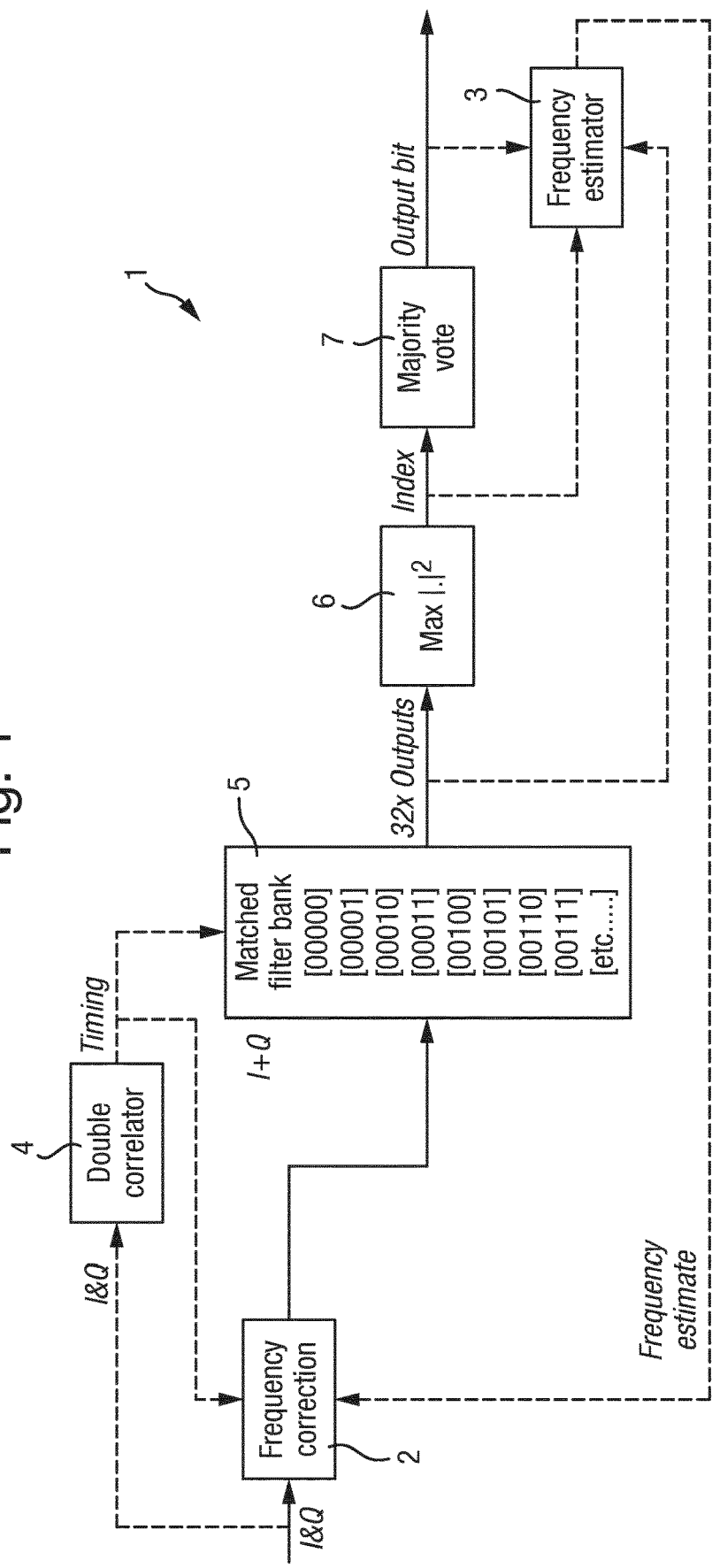

the sampled signal with their respective filter sequences using an algorithm that takes, as input, the first values ($z_n(1)$) for symbol periods at which the respective filter sequence has a first value, and the second values ($z_n(-1)$) for symbol periods at which the filter sequence has a second, different, value.

20 Claims, 2 Drawing Sheets

(51) Int. Cl.
 *H04B 1/12* (2006.01)
 *H04L 27/148* (2006.01)
(52) U.S. Cl.
 CPC ........ *H04L 27/0014* (2013.01); *H04L 27/148* (2013.01); *H04L 2027/0026* (2013.01)
(58) Field of Classification Search
 USPC .................................. 375/262, 329, 343, 350
 See application file for complete search history.

(56) References Cited

U.S. PATENT DOCUMENTS

| | | | | |
|---|---|---|---|---|
| 6,487,260 | B1* | 11/2002 | Schweickert | H04L 27/148 375/334 |
| 6,804,290 | B1 | 10/2004 | King et al. | |
| 8,538,037 | B2* | 9/2013 | Herre | H04M 9/082 381/94.3 |
| 10,411,744 | B1* | 9/2019 | Wilson | G01S 7/354 |
| 2003/0099313 | A1* | 5/2003 | Li | H04L 27/227 375/343 |
| 2003/0155922 | A1* | 8/2003 | Royle | G01V 3/081 324/326 |
| 2004/0008759 | A1* | 1/2004 | Yang | H04B 1/7093 375/152 |
| 2004/0042538 | A1* | 3/2004 | Yang | H04B 1/7093 375/152 |
| 2006/0072689 | A1 | 4/2006 | Kim et al. | |
| 2007/0121754 | A1* | 5/2007 | Mcneely | H03C 3/40 375/295 |
| 2007/0237065 | A1* | 10/2007 | Kim | H04B 1/7172 370/203 |
| 2009/0323867 | A1* | 12/2009 | Rasmussen | H04L 7/042 375/343 |
| 2010/0328157 | A1* | 12/2010 | Culkin | H01Q 21/061 342/372 |

FOREIGN PATENT DOCUMENTS

| | | |
|---|---|---|
| EP | 3 038 412 A2 | 6/2016 |
| WO | WO 2014/167318 A2 | 10/2014 |
| WO | WO 2017/098196 A1 | 6/2017 |

OTHER PUBLICATIONS

International Search Report and Written Opinion for PCT/EP2019/050119, dated Dec. 12, 2019, 21 pages.

Karami et al., "Windowed Overlapped frequency-domain Block Filtering Approach for Direct Sequence Signal Acquisition," Digital Communications and Networks, ScienceDirect, Elsevier, Oct. 9, 2017, 11 pages.

* cited by examiner

MATCHED-FILTER RADIO RECEIVER

This invention relates to methods and apparatus for decoding digital radio transmissions.

In digital radio communication a transmitted radio signal typically comprises a carrier wave, centred on a particular frequency, which is modulated to encode a stream of digital "0"s and "1" s. A radio receiver must convert the incoming analogue waveform back into a sequence of discrete bits in order to recover the transmitted message.

However, digital radio signals are subject to noise which can cause uncertainty as to whether any particular received bit should be decoded as a digital "0" or "1".

One known method for deducing a bit sequence from a received radio signal is to generate complex baseband samples from the signal, and input these to a matched filter bank. A matched filter bank comprises a set of filters, each of which cross-correlates the received signal with a respective template waveform corresponding to a fixed sequence of one or more data bits. For example, with a bank of eight filters, each filter might correspond to a different waveform representing a different sequence of five bits. Bit decisions can then be made in blocks of five, based on the filter that gives the strongest match to the waveform, in any given time interval.

WO 2014/167318, by the present applicant, addresses the problem of noise by considering multiple observations of each particular received bit, in overlapping time windows; determining whether the received bit is a 0 or 1 for each observation; and deciding the value of the bit based on a majority vote across the multiple observations.

In general, increasing the bit-length, K, of each filter will increase the sensitivity of such a receiver, such that values of K=5, K=7, or higher, are desirable. In some situations, the applicant has found that moving from K=3 to K=5 can give 1 dB or more in sensitivity improvement, or a 2.4 dB improvement for K=7. However, increasing the bit-length requires an exponential increase in the number of filters. For a non-coherent matched filter bank of length K bits, the number of multiply-accumulate operations is $O(K.R.2^K)$, where R is the oversampling rate. For a hardware-implemented radio (e.g., a radio-on-a-chip), such exponential growth in complexity means that K cannot be increased without severely increasing the area and power consumption of the demodulator. This is undesirable, especially on a power-constrained device, such as a battery-powered Bluetooth™ sensor.

The present invention seeks to address this shortcoming.

From a first aspect, the invention provides a digital radio receiver adapted to receive phase- or frequency-modulated radio signals, wherein:

the receiver comprises a matched filter bank, having a plurality of filter modules, for demodulating a sampled signal, each filter module corresponding to a respective filter sequence that spans a plurality of symbol periods, and being configured to cross-correlate the sampled signal with a representation of the filter sequence, the cross-correlation involving a plurality of samples at each of the plurality of symbol periods;

the matched filter bank is configured to calculate and store first data representing values, for respective discrete symbol periods, of a cross-correlation of the sampled signal with a first predetermined complex exponential function defined at a plurality of sample points over one symbol period, and to calculate and store second data representing values, for the respective discrete symbol periods, of a cross-correlation of the sampled signal with a second predetermined complex exponential function defined at a plurality of sample points over one symbol period, the second complex exponential function being different from the first complex exponential function; and at least two of the filter modules are configured to cross-correlate the sampled signal with representations of their respective filter sequences using an algorithm that takes, as input, values from the first data corresponding to one or more symbol periods at which the respective filter sequence has a first value, and values from the second data corresponding to one or more symbol periods at which the respective filter sequence has a second value, different from the first value.

From a second aspect, the invention provides a method of demodulating a received phase- or frequency-modulated radio signal, the method comprising:

generating a sampled signal from the received radio signal, comprising a plurality of signal samples in each of a succession of symbol periods;

calculating first data representing values, for respective discrete symbol periods, of a cross-correlation of the sampled signal with a first predetermined complex exponential function defined at a plurality of sample points over one symbol period;

calculating second data representing values, for the respective discrete symbol periods, of a cross-correlation of the sampled signal with a second predetermined complex exponential function defined at a plurality of sample points over one symbol period, the second complex exponential function being different from the first complex exponential function;

for each of a plurality of filter sequences spanning a plurality of symbol periods, cross-correlating the sampled signal with a representation of the respective filter sequence using an algorithm that takes, as input, values from the first data corresponding to one or more symbol periods at which the filter sequence has a first value, and values from the second data corresponding to one or more symbol periods at which the filter sequence has a second value, different from the first value; and using results of the cross-correlations for the plurality of filter sequences to demodulate the signal.

Thus it will be seen by those skilled in the art that, in accordance with the invention, common intermediate calculations can be performed for individual symbol periods, and the results of these intermediate calculations can then be used across a plurality of filter modules. In this way, the amount of work required to be done in each separate filter-sequence correlation operation can be reduced, resulting in better computational efficiency for the matched filter block as a whole. The matched filter block circuit can therefore be made smaller and use less power.

The radio signal may be modulated using any appropriate modulation scheme, such as binary frequency-shift keying (BFSK), continuous-phase frequency-shift keying (CPFSK), Gaussian frequency-shift keying (GFSK), minimum-shift keying (MSK), differential phase-shift keying (DPSK), offset quadrature phase-shift keying (OQPSK), or continuous phase modulation (CPM). The radio signal may be modulated in amplitude as well as phase and/or frequency—e.g., using quadrature amplitude modulation (QAM). Preferably the radio signal is modulated using a modulation scheme that has "memory"—i.e., in which the signal transmitted in one symbol period depends on the values of one or more preceding symbols, in addition to the current symbol. Depending on the type of modulation, a symbol may be one bit, or may correspond to two bits, or more. The signal may be modulated at any carrier frequency. In one set of embodiments, the signal is modulated using GFSK with a carrier frequency around 2.4 GHz. For example, the signal may be a Bluetooth™ or Bluetooth™ Low Energy signal.

The radio receiver is preferably an integrated radio receiver—e.g., a silicon chip. (It will be appreciated that the radio receiver may nevertheless require one or more off-chip components to be connected to the radio receiver for it to operate, such as a power supply, antenna, crystal, discrete capacitors, discrete resistors etc.). The device may also be a radio transmitter. The digital radio receiver may comprise one or more processors, DSPs, logic gates, amplifiers, filters, digital components, analogues components, non-volatile memories (e.g., for storing software instructions), volatile memories, memory buses, peripherals, inputs, outputs, and any other relevant electronic components or features.

While the matched filter bank could potentially be implemented in software (e.g., on a software-defined radio), in a preferred set of embodiments it is implemented in hardware—e.g., as a digital logic circuit. The digital radio receiver may comprise a processor for executing software. Each filter module preferably comprises a plurality of logic gates, not part of the processor. Each filter module may share a common design—e.g., differing only in the data that is stored in one or more registers when the receiver is in use. Each filter module may be hardwired to cross-correlate the sampled signal with a fixed set of one or more filter sequences, or each filter module may comprise a configuration input (e.g., a register input) for receiving a signal representing one or more filter sequences that the filter module is to cross-correlate the sampled signal with.

The filters in the matched filter bank preferably all have a common symbol length. This length may be even, although it is preferably odd, since this can simplify the implementation of a majority voting block which may be located downstream of the matched filter block. There is preferably a filter module for every possible filter sequence of a particular length. Thus, if the modulation is binary, and the filter length, K, is 3, 5 or 7 bits, the matched filter bank preferably has 8, 32 or 128 filter modules, respectively. It will be appreciated that a filter module may perform a cross-correlation with the representation of its filter sequence based on stored data, such as the values of the symbols of the filter sequence. The representation of the filter sequence may be generated implicitly as part of the cross-correlation calculations, and need not necessarily exist explicitly. The representation is preferably of the filter sequence, modulated using the same modulation scheme as is used by the received signal.

The cross-correlation with a representation of each filter sequence may be evaluated in discrete time steps equal to, or a multiple of, the length of the filter sequence. In this case, the sampled signal may be demodulated by identifying the filter sequence having a highest cross-correlation value for a given sequence of symbol periods, and demodulating the signal for those symbol periods as being equal to the identified filter sequence. However, the filter-sequence cross-correlation is preferably evaluated with a step size equal to one symbol period (at least, over a period of time equal to or longer than the filter sequence). This allows cross-correlation results from a plurality of steps to be used to decode each symbol. This can result in greater receiver sensitivity. The results of the cross-correlations for the filter sequences may, in some embodiments, be sent to a decision block, which may implement majority voting—e.g., as described in WO 2014/167318.

Any suitable sample rate may be used—e.g., eight samples per symbol. The samples are preferably uniformly-spaced in time. The cross-correlation operations preferably involve every sample in the received signal.

The sampled signal is preferably at baseband—i.e., the radio receiver is preferably configured to use analogue and/or digital circuitry to down-convert analogue radio signals to digital baseband samples. The samples preferably comprise a sequence of quadrature (I & Q) values.

The radio receiver preferably determines initial frequency estimate and/or symbol-timing estimate from the received signal. It preferably uses a timing estimate to synchronize the matched filter bank with the incoming data stream. It may use a frequency estimate to make frequency adjustments to the samples before they enter the matched filter bank. The matched filter bank is preferably non-coherent—i.e., it does not require an initial phase estimate in order to demodulate the signal. It preferably uses maximum-likelihood estimation to demodulate the signal.

The matched filter bank preferably evaluates the cross-correlations with the first and second complex exponential functions in steps equal to a symbol period, and preferably at a rate equal to the symbol rate of the received signal (i.e., in real time), preferably while the signal is being received by the radio receiver.

The discrete symbol periods at which the first and second data are calculated preferably comprise every symbol period over a time window. This time window is preferably set with reference to a data packet in the received signal—e.g., being at least as long as a payload portion of a data packet. However, the first and second data are not necessarily retained in a memory for the whole set of discrete symbol periods. The first and second data are preferably stored in respective buffers or shift registers, which are preferably complex-valued. The matched filter bank preferably stores at least the K most-recent of the first cross-correlation values, where K is the symbol-length of longest filter sequence (note that, preferably, all the filter sequences have the same length). Similarly, the matched filter bank preferably stores at least the K most-recent of the second cross-correlation values. As with all data used in the radio receiver, the cross-correlation values may be stored in any suitable format and at any appropriate level of precision.

The first predetermined complex exponential function is preferably a natural exponential function. The exponent is preferably entirely imaginary. The exponent is preferably a linear function of time. The exponent preferably depends on the modulation index, h, of the modulated radio signal. The function preferably represents a uniform rotation in the complex plane. The function may equal, or comprise, the term $\exp\{j\pi ht\}$ or the term $\exp\{-j\pi ht\}$, where $j=\sqrt{-1}$, h is the modulation index, and $t\in[0,1)$ is time, scaled over one symbol period. In some embodiments, $$t = \frac{r}{R},$$

where R is the number of (uniformly-spaced) sample points within one symbol period, and r indexes the sample points within the symbol period. Preferably, the cross-correlation with the first complex exponential function involves a plurality of uniformly-spaced signal samples within the symbol period. It preferably involves every signal sample in the symbol period. Thus, the plurality of sample points at which the first complex exponential function is defined preferably corresponds to a plurality of samples in one symbol period of the sampled signal, and preferably to all the samples in one symbol period of the sampled signal.

Similarly, the second predetermined complex exponential function is preferably a natural exponential function. The exponent is preferably entirely imaginary. The exponent is preferably a linear function of time. The exponent preferably depends on the modulation index, h, of the modulated radio signal. The function preferably represents a uniform rotation in the complex plane. The rotation is preferably in an opposite sense to a rotation represented by the first predetermined complex exponential function. The function may equal, or comprise, the term $\exp\{j\pi ht\}$ or the term $\exp\{-j\pi ht\}$ (preferably whichever the first predetermined complex exponential function does not equal or comprise), where $j=\sqrt{-1}$, h is the modulation index, and $t \in [0,1)$ is time, scaled over one symbol period. In some embodiments, $$t = \frac{r}{R},$$

where R is the number of (uniformly-spaced) sample points within one symbol period, and r indexes the sample points within the symbol period. The first and second complex exponential function are preferably defined over the sample points. Preferably, the cross-correlation with the second complex exponential function involves a plurality of uniformly-spaced signal samples within the symbol period. It preferably involves every signal sample in the symbol period. Thus, the plurality of sample points at which the second complex exponential function is defined preferably corresponds to a plurality of samples in one symbol period of the sampled signal, and preferably to all the samples in one symbol period of the sampled signal.

Thus, the matched filter bank may calculate and store, for each received data symbol, first data representing a value, at that data symbol, of a cross-correlation of the sampled signal with a phase shift characteristic of a first symbol value, and second data representing a value, at that data symbol, of a cross-correlation of the sampled signal with a phase shift characteristic of a second symbol value. However, the matched filter bank performs these calculations without taking account of the relative phase at the start of each symbol period in the sampled signal. Since each filter sequence spans a plurality of symbol periods, it is necessary for each filter module to set the correct relative starting phase of each symbol, based on the values in its respective filter sequence, in order to perform a cross-correlation over the whole filter sequence. However, making such adjustments is less computationally complex than each filter module performing a cross-correlation independently of the other filter modules.

Each filter module preferably has complexity O(K), for a filter sequence of length K symbols, independent of the sampling rate. A matched filter bank of $2^K$ equal-length filters therefore preferably has complexity $O(K.2^K)$. This compares favourably with prior-art matched filter banks having $O(K.R.2^K)$.

Preferably, each of the filter modules uses the first data or the second data, or both, when correlating a plurality of symbol periods in the sampled signal with a representation of its respective filter sequence. Of course, a filter having a sequence of all one symbol value (e.g., "00000" or "11111") may use only one of the first data and the second data. However, some or all of the other filters may use both the first data and the second data.

The algorithm used by the filter modules preferably takes, as input, values from the first data corresponding to each symbol period at which the respective filter sequence has a first value, and values from the second data corresponding to each symbol period at which the respective filter sequence has the second value. Each value from the first data, corresponding to particular symbol period, may equal the value, at that symbol period, of the correlation with the first predetermined complex exponential function. Similarly, each value from the second data, corresponding to particular symbol period, may equal the value, at that symbol period, of the correlation with the second predetermined complex exponential function. However, in some embodiments, the value from the first and/or second data might comprise a transformation or function of the actual correlation value.

The algorithm preferably applies a rotation to each of the input values from the first and second data. The rotations may be applied based on a zero starting phase, or the filter may apply the rotations relative to a non-zero starting phase (e.g., relative to a starting phase which has been accumulated over all the symbol periods since the filter was initialised at the start of the transmission). For some input values (e.g., corresponding to the first symbol period in the filter sequence), the rotation or relative rotation may be zero (i.e., no rotation); however, the rotation or relative rotation is preferably non-zero for at least one or more of the input values. The rotation or relative rotation (e.g., its size and sense) for each symbol period preferably depends on the values of the filter sequence that precede the symbol period to which the input value corresponds. The rotation or relative rotation for each symbol period in the filter sequence is preferably equal to the sum of the rotations corresponding to the values in the filter sequence that precede the symbol period to which the input value corresponds. For binary-modulated signals, the algorithm preferably multiplies each input value by $\exp\{-j\pi hs\}$ (or, in other embodiments, by $\exp\{j\pi hs\}$), where s depends on the difference between the number of "one" bits and the number of "zero" bits in the filter sequence preceding the symbol period to which the input value corresponds, and where $j=\sqrt{-1}$, and h is the modulation index. In some embodiments, s equals the number of "one" bits minus the number of "zero" bits (or vice versa) preceding the respective symbol period in the filter sequence. However, in other implementations, s need not be initialized to zero before the first symbol period, but may have a non-zero starting value, $s_{-1}$, with the value of s at each symbol period equalling $s_{-1}$ plus the number of "one" bits minus the number of "zero" bits (or the number of "zero" bits minus the number of "one" bits) preceding the respective symbol period in the filter sequence. This has no effect on the cross-correlation result, which is independent of the starting phase.

The algorithm preferably performs a summation operation of the rotated input values over the whole filter sequence. The rotated input values may be scaled or otherwise transformed during the summation operation. However, in a preferred set of embodiments the algorithm simply sums all the rotated input values over the filter sequence. The output of the summation operation preferably then is the value of the cross-correlation of the sampled signal with the representation of the filter sequence, at a particular point in time.

For demodulating certain quadrature-modulated signals (e.g., a QPSK signal), the matched filter bank may be configured to additionally calculate and store third data and fourth data, representing values, for the respective discrete symbol periods, of a cross-correlation of the sampled signal with third and fourth predetermined complex exponential functions, respectively, defined at respective pluralities of sample points over one symbol period, the third and fourth complex exponential functions being different from each other and from the first and second complex exponential functions.

The processing of the first and second data may be extended to the third and fourth data similarly.

The inventors have realised that a further efficiency gain may be made by sharing intermediate calculation results between filter modules, relating to sequences of two or more successive symbols in the sampled signal. This can further reduce the computational complexity of the filter bank. Thus, in some embodiments, a value calculated during a first cross-correlation operation, for a particular filter sequence, for a first position in the received signal, is used when determining a second cross-correlation value, for a second filter sequence, for a second position in the received signal. The second position is preferably offset, later in time, from the first position by a number of symbol periods. The first filter sequence and the second filter sequence preferably contain a common contiguous sub-sequence, the position of the sub-sequence in the second filter sequence being offset from its position in the first filter sequence by said number of symbol periods.

The offset is preferably in the direction of earlier-received symbols in the second cross-correlation operation. In this way, a common set of symbols in the received signal is aligned with the sub-sequence in the both the first cross-correlation operation and the second cross-correlation operation. The receiver is preferably configured to evaluate a function of this set of symbols and said sub-sequence. This output is preferably used when determining the second cross-correlation value. The function may comprise a dot product operation. The sub-sequence preferably comprises at least two symbols. In some embodiments, the sub-sequence preferably comprises all the symbols of the first filter sequence except for a number of symbols equal to the size of the offset, n—preferably these are the symbols in the first filter sequence that align with the n oldest-received symbols in the sampled signal.

This idea is believed to be inventive in its own right and so, from another aspect, the invention provides a digital radio receiver adapted to receive phase- or frequency-modulated radio signals, and being configured to:

determine a first cross-correlation value between a received signal and a representation of a first filter sequence, for a first position in the received signal; and use a value calculated during the first cross-correlation when determining a second cross-correlation value between the received signal and a representation of a second filter sequence, for a second position in the received signal, wherein the second position is offset from the first position by a number of symbol periods, and wherein the second filter sequence contains a contiguous sub-sequence of the first filter sequence, offset within the second filter sequence, relative to the position of the sub-sequence within the first filter sequence, by said number of symbol periods.

From a further aspect, the invention provides a method of demodulating a received phase- or frequency-modulated radio signal, the method comprising:

determining a first cross-correlation value between a received signal and a representation of a first filter sequence, for a first position in the received signal; and using a value calculated during the first cross-correlation to determine a second cross-correlation value between the received signal and a representation of a second filter sequence, for a second position in the received signal, wherein the second position is offset from the first position by a number of symbol periods, and wherein the second filter sequence contains a contiguous sub-sequence of the first filter sequence, offset within the second filter sequence, relative to the position of the sub-sequence within the first filter sequence, by said number of symbol periods.

Thus it will be seen by those skilled in the art that, by translating a contiguous sub-sequence (i.e., a sub-string) in time, in sync with the received signal, so that the sub-sequence remains aligned with the same symbols of the received signal for both cross-correlation operations, the receiver can re-use one or more calculation results generated during the first cross-correlation operation in the second cross-correlation operation. This can result in better computational efficiency. A receiver, or a matched filter block circuit, based on this principle can therefore be made smaller and use less power than previously.

Features of other aspects or embodiments described herein may be features of embodiments of these aspects also.

The value may be the first cross-correlation value, or it may be an intermediate value calculated as part of the first cross-correlation operation. It may be stored in a memory, such as a register.

In one set of embodiments, the receiver comprises a first filter module which performs the first cross-correlation, and a second filter module which performs the second cross-correlation. The first filter module may use the first filter sequence for the duration of the demodulation of the received signal, and the second filter module uses the second filter sequence for the duration of the received signal. For example, the first filter module may always use the 5-bit filter sequence "10011" (with the left-most bit corresponding to the oldest-received bit of the received signal), while the second filter module may always use the 5-bit filter sequence "00110". Note that the 4-bit subsequence "0011" appears in both sequences, shifted earlier in time by one bit period in the second sequence. The second filter module may receive a value calculated by the first filter module (e.g., via a bus, or a shared register) and may use this when determining the second cross-correlation value. This value may be the first cross-correlation value. The receiver may comprise a matched filter bank having a filter module for every possible filter sequence of a particular length (e.g., 32 filter modules covering every 5-bit binary sequence). Preferably, two or more filter modules, or every filter module, are arranged to receive a value calculated, for the first position in the received signal, by a respective other one of the filter modules, and to use the received value when determining a cross-correlation value for the second position in the received signal. This receiving of values preferably occurs continuously, for every successive position in the received signal. For example, when the offset is one bit long, the filter module with sequence "00100" may receive a value from the filter module with sequence "00010". The filter module with sequence "00101" may also receive the same value from the filter module with sequence "00010", or it may receive a value from the filter module with sequence "10010".

However, in another set of embodiments, one filter module determines both the first cross-correlation value and the second cross-correlation value. The filter module is preferably arranged to determine a succession of cross-correlation values, for a succession of symbol periods, between the received signal and a succession of circular shifts of the first filter sequence. The second filter sequence is preferably then a circular shift of the first filter sequence, by the offset number of symbol periods. For example, the filter module may use the 5-bit filter sequence "10011" for the first cross-correlation, followed by "00111". The filter module may cycle the filter sequence continuously for the duration of the demodulation of the received signal. For example, using "10011", then "00111", "01110", "11100", "11001", "10011", "00111", etc. The filter module preferably comprises a circular shift register, with each cell of the shift register storing, or being arranged to store (e.g., once initialised by software), data representing a respective symbol of the first filter sequence. The filter module may be arranged to store a value calculated when determining the first cross-correlation value, and may be arranged to use the value when determining the second cross-correlation value. The value may be the first cross-correlation value.

The receiver may comprise a matched filter bank having filter modules for every possible filter sequence of a particular length (e.g., 32 filter modules covering every 5-bit binary sequence). However, the distribution of the filter sequences between the filter modules preferably changes over time. In particular, each filter module is preferably arranged to determine a succession of cross-correlation values, for a succession of symbol periods, between the received signal and a succession of circular shifts of a respective filter sequence. Some or all of the filter modules may comprise respective circular shift registers, with each cell of the shift register storing, or being arranged to store (e.g., once initialised by software), data representing a respective symbol of the respective filter sequence. (Of course, for filter sequences that consist of only one symbol, such as "11111", a circular shift does not change the sequence; however, the corresponding filter module may nevertheless still comprise a shift register, since a common filter module design across the filter bank can aid the design process.) Each of the filter modules may have features of any filter module described herein.

In any embodiments, for a particular first filter sequence, the value preferably depends on one or more symbols in the received signal on which both the first cross-correlation value and the second cross-correlation value depend—i.e., on symbols that are aligned with the sub-sequence of the first filter sequence. Thus, the value may depend on all the symbols of the received signal that affect the first cross-correlation calculation, except for the n oldest-received symbols, where n is the size of the offset. Note that the value may nevertheless also depend on these oldest-received symbols; however, the contribution of the n oldest-received symbols to the value is preferably subtracted, or otherwise removed, from the value when the value is used to determine the second cross-correlation value.

The value may be used as input to an algorithm which adds and/or subtracts terms to the value in order to calculate the second cross-correlation value. The algorithm may subtract a term corresponding to one or more symbols in the received signal, such as the n oldest-received symbols in the first cross-correlation calculation, where n is the size of the offset. The algorithm may add a term corresponding to one or more symbols in the received signal, such as the n newest-received symbols in the second cross-correlation calculation, where n is the size of the offset.

In some embodiments, a filter module uses the previously-described first and second data to determine a term to subtract from the value, and/or to determine a term to add to the value.

The filter module may comprise a summand shift register arranged to store terms to be subtracted and/or added to the value, at successive cross-correlation steps. The summand shift register may be arranged to store rotated values from the first and/or second data. It preferably has one cell for each symbol position in the filter sequence, and is arranged to store a rotated value in each cell corresponding to a respective symbol in the filter sequence. A new value is preferably input to the shift register at each symbol period—i.e. so that the summand register shifts at the same rate as the circular shift register, in embodiments that use a circular shift register. As before, the first and second data are preferably made available to all the filter modules.

In this way, instead of calculating a cross-correlation value for each filter sequence, at every time step, the cross-correlation values from the preceding time step can be re-used when determining the cross-correlation values for the current time step, saving significant computational effort. In some embodiments, the complexity of a matched filter bank implementing these ideas, for a binary modulation scheme, is $O(2.2^K)$, for a common filter-sequence length of K bits, regardless of the sampling rate R.

Features of any aspect or embodiment described herein may, wherever appropriate, be applied to any other aspect or embodiment described herein. Where reference is made to different embodiments or sets of embodiments, it should be understood that these are not necessarily distinct but may overlap.

Figure 2:
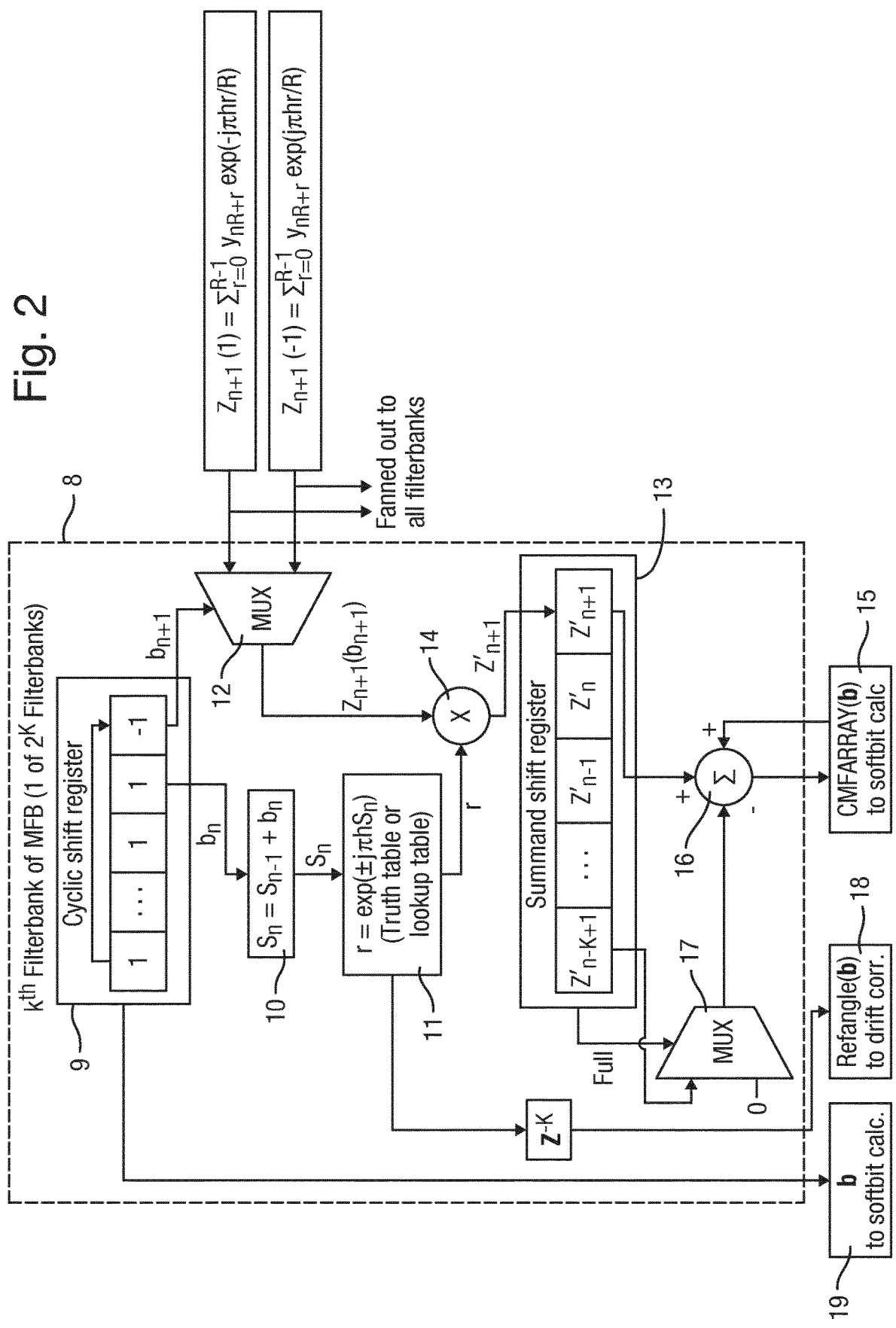

Certain preferred embodiments of the invention will now be described, by way of example only, with reference to the accompanying drawings, in which:

FIG. 1 is a schematic diagram of part of a digital radio receiver embodying the invention; and FIG. 2 is a schematic diagram of a filter from the matched filter bank of the digital radio receiver.

FIG. 1 shows part of a digital radio receiver 1 for receiving continuous-phase frequency-shift-key (FSK)-encoded signals. It may be a Bluetooth™ LE receiver. Not shown are an antenna, amplifier, tuning and analogue-to-digital conversion stages, which are conventional. These yield a sequence of complex-valued digital samples, I & Q, at baseband, representing a received radio signal around a particular frequency (e.g., in a band in the 2.4 GHz spectrum. These may be oversampled by a factor R. In the present example, R=8. The principal path through the components is shown with solid arrows in FIG. 1, while paths that relate to control of timing and frequency corrections are shown with dashed arrows.

The complex baseband samples are fed into a frequency correction block 2, which performs complex rotation on the samples to compensate for any carrier-frequency offset, based on outputs from a frequency estimator 3 and from a double correlator unit 4.

The complex baseband samples are also fed to a double correlator unit 4 which performs an initial frequency offset as well as timing recovery and frame synchronization, by cross-correlating the received signal against a stored template, which corresponds to a fixed part of the preamble of any data packet that is intended for this radio receiver 1. The correlation is performed every sample. This timing information from the double correlator unit 4 is output to the frequency correction block 2 and to a matched filter bank 5. The frequency estimate needs to be relatively accurate (e.g., to within around 10 kHz) in to avoid significant sensitivity degradation.

The matched filter bank 5, in addition to the timing information, also receives the frequency-corrected samples from the frequency correction block 2. The matched filter bank 5 contains $2^K$ unique filters, each K bits long. In one particular example, K=5, so there are 32 filters, each five bits long, covering all possible 5-bit sequences; however, K may of course have other values in other embodiments. Each filter uses the timing information to carry out a complex cross-correlation operation between a respective bit pattern and the received signal, as described in more detail below. The matched filter bank 5 outputs $2^K$ complex correlation coefficients, one for each filter.

These complex coefficients are output to a magnitude comparison block 6, which computes the real-valued squared modulus of each coefficient and compares them to identify the largest coefficient. The magnitude comparison block 6 outputs the index, [0 . . . K], corresponding to the filter that best matches the received signal. These correlations are non-coherent, meaning that no tracking of phase is required.

The matched filter bank 5 performs correlations at the bit rate of the received signal, so the magnitude comparison block 6 outputs one index every bit period. This means that every bit is considered at K different bit periods, over a sliding window. Where K=5, information about a specific bit is obtained five times. K is preferably odd, and so a majority vote block 7 can determine whether it should be decoded as a "0" or a "1", based on whether a majority of the K indices from the magnitude comparison block 6 correspond to a "0" or a "1" at the relevant bit position. This voting approach is described in more detail in WO 2014/167318, by the present applicant, the entire contents of which are incorporated herein by reference. This majority voting has been found to improved sensitivity by around 1 dB, compared with considering each bit position just once.

The majority vote block 7 outputs a demodulated bit value at each bit period.

The complex coefficients from the matched filter bank 5 are also sent to the frequency estimator 3, which uses them to estimate any frequency drift. The frequency estimator 3 uses (i) the correlation coefficients, (ii) the maximum index from the magnitude comparison block 6, and (iii) the demodulated output bit stream, to estimate the relative phase between two time instances, for which there have been an equal number of "0" and "1" bits between the two time instances, as described in WO 2014/167318. This frequency information is used by the frequency correction block 2 on an on-going basis. This is necessary because frequency may drift over time due to oscillator instability in the transmitter and/or the receiver 1. However, it is generally has a more minor effect on the behaviour of the frequency correction block 2 than does the timing information output by the double correlator 4.

The output bit stream can then be processed further by the radio receiver 1, or some other component or device, as appropriate.

The behaviour of the matched filter bank (MFB) 5 will now be explained in more detail, assuming the filter lengths to be K bits long (which may equal five bits in some embodiments).

In general, a frequency shift keying (FSK) signal, with modulation index h, and oversampling ratio R, can be defined as:

$$x_{nR+r} = x_{nR}\exp\left\{j\pi h\beta_n \frac{r}{R}\right\} \quad (1)$$

$$= \sqrt{P_x}\exp\left\{j\pi h\left(\beta_n\frac{r}{R} + \sum_{l=0}^{n-1}\beta_l\right)\right\}$$

where n indicates the current bit position, and r∈[0, R−1] indexes the current sample offset, from the symbol's timing anchor. Assuming the received signal is binary-FSK modulated, the value $\beta_k$, for each k between 0 and n, represents the sign (i.e., −1 or 1) of the instantaneous phase shift corresponding to the $k^{th}$ bit in the bit stream, $bit_k$; it is formally defined as $\beta_k \triangleq 2.bit_k - 1$. The sum inside the exponential represents the accumulated phase offset of all the symbols leading up to the current symbol, accumulated over the whole bit stream thus far. $P_x$ is the power at $x_0$.

If the signals were encoded using 4-FSK, instead of binary-FSK, the $P_k$ would take values in the set {−1.5, −0.5, +0.5, +1.5}, depending on the phase shift of the $k^{th}$ bit in the bit stream, instead of {−1, 1}. The following explanation assumes 2-FSK; however, the same underlying approach can be adapted to n-FSK modulation or to other modulation types.

The received signal is then given by $$y_{nR+r}=hx_{nR+r}+v_{nR+r}$$

where h is a complex number representing the channel gain and phase, and $v_{nR+r}$ is a noise term.

The noncoherent MFB 5 detects this received signal, by noncoherently correlating it with $2^K$ possible filters that have coefficients corresponding to the modulated signal for all possible K-bit sequences. In some cases, the transmitted signal may employ pulse-shaping, so that the model in equation (1) does not apply. For example, if it is a received Bluetooth Low Energy signal, it will be encoded using GFSK, in which the phase is Gaussian filtered. However, it is still possible for the coefficients of the MFB 5 in the receiver 1 to be based on equation (1) and successfully demodulate such a signal.

The output of the MFB 5, at symbol time n, for a filter using fixed bit sequence b={$b_0$, $b_1$, $b_{K-1}$}, where the $b_i$'s here are the signs of the actual bits—i.e., representing the bits {0, 1} as the values {−1, 1} respectively—of the particular filter, is given by $$d_n(b) \triangleq \sum_{k=0}^{K-1}\sum_{r=0}^{R-1} y_{(n-(K-1)+k)R+1}\exp\left\{-j\pi h\left(b_k\frac{r}{R}+\sum_{l=0}^{k-1}b_l\right)\right\} \quad (2)$$

(The inner sum term over ID, is defined to be zero when k=0.) The particular bit sequence b that maximizes $|d_n(b)|^2$ is the noncoherent maximum likelihood estimate. This is determined by the magnitude comparison block 6.

A naive calculation of $d_n(b)$, for each b, would have complexity O(KR). The total complexity for the entire MFB, if implemented naively, would therefore be $O(KR.2^K)$.

However, the MFB 5, embodying the invention, is implemented more efficiently than this, based on the following insights.

Define $$s_k \triangleq \sum_{l=0}^{k} b_l$$

for positive values of k, and define $$s_{(-1)} \triangleq 0$$

in the special case of k=−1.

Each value $s_k$ represents the sum of the signs of k bits for a particular matched filter. A set of $s_k$, for k between 0 and K−1, can easily be calculated as required, or pre-computed and stored, for each filter.

Also define $$z_m(-1) \triangleq \sum_{r=0}^{R-1} y_{mR+r} \exp\left\{-j\pi h\left(\frac{-r}{R}\right)\right\}$$

$$z_m(1) \triangleq \sum_{r=0}^{R-1} y_{mR+r} \exp\left\{-j\pi h\left(\frac{r}{R}\right)\right\}$$

The most recent K values of $z_m(-1)$ and $z_m(1)$ for m=n−(K−1) to n, are stored in two complex-valued shift registers, each of length K. These two shift registers are updated every time a new symbol arrives at the receiver 1 (i.e., every time n increments by one).

The output of the MFB 5 can them be written as $$d_n(b) = \sum_{k=0}^{K-1} z_{(n-(K-1)+k)}(b_k) \exp\left\{-j\pi h \sum_{l=0}^{k-1} b_l\right\} \quad (3)$$

$$= \sum_{k=0}^{K-1} z_{(n-(K-1)+k)}(b_k) \exp\{-j\pi h s_{(k-1)}\}$$

The squared magnitude (which is calculated in the MFB 5 and/or in the magnitude comparison block 6) is then $$|d_n(b)|^2 = \left|\sum_{k=0}^{K-1} z_{(n-(K-1)+k)}(b_k) \exp\{-j\pi h s_{(k-1)}\}\right|^2$$

The values of $z_{(n-(K-1)+k)}(b)$, for k=0 to K−1, and b=−1 & 1, are already stored in the two shift registers. These same values can be applied across all of the $2^K$ filters, when calculating $|d_n(b)|^2$ for each of the respective filter sequences, b. This avoids the need to calculate the inner sum over the oversampling in equation (2) above, for each filter.

In some embodiments, the MFB 5 is arranged to perform the calculations (multiplications, summation, etc.) as set out in equation (3). This reduces the complexity of calculating the $|d_n(b)|^2$, for each b, to O(K). The total complexity of the MFB 5 and the magnitude comparison block 6, based on this approach to calculation, is then only $O(K \cdot 2^K)$.

Some embodiments achieve even greater efficiency by using a novel iterative method to calculate the MFB outputs efficiently, exploiting the fact that the observation interval is shifted one symbol at a time, and the fact that the $2^K$ filters, between them, cover every combination of K bits.

Because there is a filter for every possible sequence of K bits, cyclically rotating the bits of each filter by one position (e.g., 00011−>00110) will still result in a set of filters covering all $2^K$ sequences. This insight can be used to avoid having to calculate each cross-correlation calculation from scratch every time a new symbol arrives. Instead, by designing each matched filter circuit so that it rotates its filter sequence bits at the same rate as new data bits are received, the result of one cross-correlation calculation can form the starting point for the next calculation by the same filter.

To see how this is justified mathematically, note that, for symbol n, each of the 2K matched filters will calculate the following, for a unique sequence of bit signs $b_0 \ldots b_{K-1}$:

$$d_n([b_0 \ldots b_{K-1}]) = \sum_{k=0}^{K-1} z_{(n-(K-1)+k)}(b_k) \exp\left\{-j\pi h \sum_{l=0}^{k-1} b_l\right\} =$$

$$\sum_{k=0}^{0} z_{(n-(K-1)+k)}(b_k) \exp\left\{-j\pi h \sum_{l=0}^{k-1} b_l\right\} +$$

$$\sum_{k=1}^{K-1} z_{(n-(K-1)+k)}(b_k) \exp\left\{-j\pi h \sum_{l=0}^{k-1} b_l\right\} =$$

$$z_{(n-(K-1))}(b_0) + \sum_{k=1}^{K-1} z_{(n-(K-1)+k)}(b_k) \exp\left\{-j\pi h \sum_{l=0}^{k-1} b_l\right\}$$

At the next symbol interval, n+1, if the filter bits are rotated one position, to give a new sequence $b_1 \ldots b_{K-1} b_0$, the same filter will then be required to calculate:

$$d_{n+1}([b_1 \ldots b_{K-1} b_0]) = \sum_{k=0}^{K-2} z_{(n+1-(K-1)+k)}(b_{k+1}) \exp\left\{-j\pi h \sum_{l=0}^{k-1} b_{l+1}\right\} +$$

$$\left(z_{(n+1)}(b_0) \exp\left\{-j\pi h \sum_{l=0}^{K-2} b_{l+1}\right\}\right) =$$

$$\sum_{k=1}^{K-1} z_{(n-(K-1)+k)}(b_k) \exp\left\{-j\pi h \sum_{l=1}^{k-1} b_l\right\} + \left(z_{(n+1)}(b_0) \exp\left\{-j\pi h \sum_{l=0}^{K-2} b_{l+1}\right\}\right)$$

By comparing these two equations, it can be seen that $d_{n+1}([b_1 \ldots b_{K-1} b_0])$ can be calculated from the previous result, $d_n([b_0 \ldots b_{K-1}])$, as follows:

$$d_{n+1}([b_1 \ldots b_{K-1} b_0]) =$$

$$d_n([b_0 \ldots b_{K-1}]) - (z_{(n-(K-1))}(b_0)) + \left(z_{(n+1)}(b_0) \exp\left\{-j\pi h \sum_{l=0}^{K-2} b_{l+1}\right\}\right)$$

FIG. 2 shows a circuit for an exemplary one of the $2^K$ matched filters submodules 8. The MFB 5 may contain $2^K$ such submodules 8, each holding a different bit sequence in its cyclic shift register 9. Each submodule 8 correlates using a different bit sequence, obtained by cycling the cyclic shift register 9—e.g., for K=5, a specific module instance will calculate the filter outputs corresponding to the bit sequences for 00001, 00010, 00100, 01000, 10000, 00001, 00010, ... at successive time instances. Another submodule 8 may be one step out of sync and correlate using 00010, 00100, 01000, 10000, 00001, 00010, 00100, .... By initializing the $2^K$ registers to unique bit sequences and updating cyclically in this way, it is guaranteed that the filter outputs will correspond to $2^K$ unique sequences.

Although FIG. 2 shows a K-bit cyclic shift register 9 as holding sign values, i.e. values in {−1, 1}, it will be appreciated that, in practice, it may be more efficient for the register to hold true bit values, i.e. values in {0, 1}, with a conversion to the sign values being performed each time a bit is read out of the register.

For convenience, the annotations in FIG. 2 index the bit sign values as "$b_n$" to match the indexing of the symbols that are being demodulated. These indices can be mapped to the K bit positions of the shift register by taking the value of n modulo K.

The submodule 8 operates as follows.

Similar to the embodiment described above, the two values of $z_{n+1}(1)$ and $z_{n+1}(-1)$ are calculated before each filter submodule is activated when each new received symbol.

An addition block 10 calculates a value $s_n$ iteratively using the last element in the bit register 9, i.e. $s_n = s_{n-1} + b_n$. The current value of $s_n$ is used to generate a rotation $e^{-j\pi h s_n}$ in a rotation block 11.

The submodule 8 uses a multiplexer 12 to determine which one of $z_{n+1}(1)$ and $z_{n+1}(-1)$ to store, in rotated form, in a complex-valued summand shift register 13 of dimension K+1, based on the value of the last bit in the cyclic shift register 9. This summand shift register 13 is shifted for every incoming symbol. Before being stored, the value of $z_{n+1}$ is rotated by being multiplied with the output of the rotation block 11, in a multiplier 14. In other words, at each symbol update, the filter submodule 8 calculates a value $z'_{n+1}(b_{n+1}) = e^{-j\pi s_n} z_{n+1}(b_{n+1})$, for $b_{n+1}=1$ or $-1$, and stores this in the summand shift register 13. Note that, as with the previous embodiment, the two $z_{n+1}$ values need only be calculated once and can then be used across all $2^K$ filter submodules 8. Although the value of $s_n$ is here accumulated over the entire transmission, rather than being initialized to zero at the start of each cross-correlation operation, this does not affect the output of the cross-correlation since it is the change in $s_n$ over the K bits of the filter that affects the output, rather than the absolute value.

If the modulation index h is a multiple of 0.5 then $e^{-j\pi h s_n}$ will be always be in {+1, −1, +i, −i} and so the multiplication operation $e^{-j\pi s_n} \cdot z_{n+1}(b_{n+1})$ can be replaced by a truth-table look-up. For example, where h=0.5, the following table can be used:

| $e^{-j\pi h s_n}$ | $Re(e^{-j\pi h s_n} z_{n+1}(b_{n+1}))$ | $Im(e^{-j\pi h s_n} z_{n+1}(b_{n+1}))$ |
|---|---|---|
| 1 | $Re(z_{n+1}(b_{n+1}))$ | $Im(z_{n+1}(b_{n+1}))$ |
| i | $-Im(z_{n+1}(b_{n+1}))$ | $Re(z_{n+1}(b_{n+1}))$ |
| −1 | $-Re(z_{n+1}(b_{n+1}))$ | $-Im(z_{n+1}(b_{n+1}))$ |
| −i | $Im(z_{n+1}(b_{n+1}))$ | $-Re(z_{n+1}(b_{n+1}))$ |

To extend this, if h is a rational number then $e^{-j\pi h s_n}$ can have only a finite number of number of values. These values can be stored in a lookup table of size equal to the denominator of h. For example, the receiver 1 may be designed for h=⅓, which is close to the modulation index of 0.32 used in certain radio protocols by the applicant. This requires only six entries in a lookup table three rows tall.

The submodule 8 outputs the value of each cross-correlation calculation to a memory, outside the submodule 8, which stores a set of recent values in an array 15, called "CMFARRAY(b))" in FIG. 2, for use in decoding each bit—e.g., using a majority voting block, referred to in FIG. 2 as performing a "softbit calc". The most-recent value in the array 15, $d_n$, is also used as a starting point for calculating the next cross-correlation value, $d_{+1}$.

At each iteration, the most-recent correlation value, $d_n$, is read from the array 15, and an addition/subtraction unit 16 subtracts from it the oldest value stored in the summand shift register 13, and adds to it the newest value stored in the summand shift register 13. The oldest value corresponds to the received symbol period that was involved in the preceding correlation calculation, but which is no longer in the time window considered by the current correlation calculation. The newest value corresponds to the most-recently received symbol, which is involved in the current correlation calculation, but which was not involved in the preceding correlation calculation.

The output of the addition/subtraction unit 16 is the new correlation value, which is then written to the array 15, and the process repeats for the next symbol period, and so on.

A multiplexer 17 is used when the demodulator first starts, in order to detect when the summand shift register 13 is not yet full. In this case, no subtraction is required at the addition/subtraction unit 16, since K symbols have not yet been received. Once the multiplexer 17 detects that the summand shift register 13 is full, it starts subtracting the oldest symbol value at each iteration, as described above.

The submodule 8 also has an output 18 of a phase correction value from the rotation block 11 to a drift correction module ("drift corr."), which can use it for tracking frequency offset, the precise details of which are not important here. The submodule 8 also has an output 19 of the oldest bit of the filter sequence, at each iteration, for use in a bit decision module, the details of which are not important here.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A digital radio receiver adapted to receive phase- or frequency-modulated radio signals, wherein:
   the receiver comprises a matched filter bank, having a plurality of filter modules, for demodulating a sampled signal, each filter module corresponding to a respective filter sequence that spans a plurality of symbol periods, and being configured to cross-correlate the sampled signal with a representation of the filter sequence, the cross-correlation involving a plurality of samples at each of the plurality of symbol periods;
   the matched filter bank is configured to calculate and store first data representing values, for respective discrete symbol periods, of a cross-correlation of the sampled signal with a first predetermined complex exponential function defined at a plurality of sample points over one symbol period, and to calculate and store second data representing values, for the respective discrete symbol periods, of a cross-correlation of the sampled signal with a second predetermined complex exponential function defined at a plurality of sample points over one symbol period, the second complex exponential function being different from the first complex exponential function; and
   at least two of the filter modules are configured to cross-correlate the sampled signal with representations of their respective filter sequences using an algorithm that takes, as input, values from the first data corresponding to one or more symbol periods at which the respective filter sequence has a first value, and values from the second data corresponding to one or more symbol periods at which the respective filter sequence has a second value, different from the first value.

2. The digital radio receiver of claim 1, wherein the matched filter bank is implemented as a hardware digital logic circuit.

3. The digital radio receiver of claim 1, wherein each filter module has a common design.

4. The digital radio receiver of claim 1, configured to use maximum-likelihood estimation to demodulate the signal.

5. The digital radio receiver of claim 1, wherein the matched filter bank is configured to evaluate the cross-correlations with the first and second complex exponential functions in steps equal to a symbol period.

6. The digital radio receiver of claim 1, wherein each of the first and second predetermined complex exponential functions is a natural exponential function having an exponent that is a linear function of time.

7. The digital radio receiver of claim 6, wherein each of the first and second predetermined complex exponential functions represents a uniform rotation in the complex plane.

8. The digital radio receiver of claim 7, wherein the first predetermined complex exponential function is $\exp\{-j\pi ht\}$ and the second predetermined complex exponential function is $\exp\{-j\pi ht\}$, where $j=\sqrt{-1}$, h is a modulation index of the sampled signal, and $t \in [0,1)$ is time scaled over one symbol period.

9. The digital radio receiver of claim 1, wherein the matched filter bank comprises a filter module for every possible filter sequence of a particular length.

10. The digital radio receiver of claim 1, wherein each of the filter modules uses the first data or the second data, or both the first data and the second data, when correlating a plurality of symbol periods in the sampled signal with a representation of its respective filter sequence.

11. The digital radio receiver of claim 1, wherein said algorithm takes, as input, values from the first data corresponding to every symbol period at which the respective filter sequence has a first value, and values from the second data corresponding to every symbol period at which the respective filter sequence has the second value.

12. The digital radio receiver of claim 1, wherein said algorithm applies a rotation to each of the input values from the first and second data, the rotation being non-zero for at least some of the input values.

13. The digital radio receiver of claim 1, wherein said algorithm multiplies each input value by $\exp\{-j\pi hs\}$, or by $\exp\{j\pi hs\}$, where s depends on the difference between the number of "one" bits and the number of "zero" bits in the filter sequence preceding the symbol period to which the input value corresponds, and where $j=\sqrt{-1}$, and h is a modulation index of the sampled signal.

14. The digital radio receiver of claim 13, wherein said algorithm performs a summation operation of the rotated input values over the whole filter sequence.

15. The digital radio receiver of claim 1, configured to calculate a value during a first cross-correlation operation, for a particular filter sequence, for a first position in the sampled signal, and to use said value when determining a second cross-correlation value, for a second filter sequence, for a second position in the sampled signal.

16. The digital radio receiver of claim 15, wherein the second position is offset in time from the first position by a number of symbol periods, and wherein the first filter sequence and the second filter sequence contain a common contiguous sub-sequence comprising at least two symbols, the position of the sub-sequence in the second filter sequence being offset from the position of the sub-sequence in the first filter sequence by said number of symbol periods.

17. A method of demodulating a received phase- or frequency-modulated radio signal, the method comprising:
generating a sampled signal from the received radio signal, comprising a plurality of signal samples in each of a succession of symbol periods;
calculating first data representing values, for respective discrete symbol periods, of a cross-correlation of the sampled signal with a first predetermined complex exponential function defined at a plurality of sample points over one symbol period;
calculating second data representing values, for the respective discrete symbol periods, of a cross-correlation of the sampled signal with a second predetermined complex exponential function defined at a plurality of sample points over one symbol period, the second complex exponential function being different from the first complex exponential function;
for each of a plurality of filter sequences spanning a plurality of symbol periods, cross-correlating the sampled signal with a representation of the respective filter sequence using an algorithm that takes, as input, values from the first data corresponding to one or more symbol periods at which the filter sequence has a first value, and values from the second data corresponding to one or more symbol periods at which the filter sequence has a second value, different from the first value; and
using results of the cross-correlations for the plurality of filter sequences to demodulate the signal.

18. The method of claim 17, wherein the radio signal is modulated using a modulation scheme in which a signal representing a current symbol period depends on values of one or more preceding symbols, in addition to the current symbol.

19. The method of claim 18, wherein the radio signal is modulated using binary frequency-shift keying (BFSK), continuous-phase frequency-shift keying (CPFSK), Gaussian frequency-shift keying (GFSK), minimum-shift keying (MSK), differential phase-shift keying (DPSK), offset quadrature phase-shift keying (OQPSK), or continuous phase modulation (CPM).

20. A digital radio receiver adapted to receive phase- or frequency-modulated radio signals, and being configured to:
determine a first cross-correlation value between a received signal and a representation of a first filter sequence, for a first position in the received signal; and
use a value calculated during the first cross-correlation when determining a second cross-correlation value between the received signal and a representation of a second filter sequence, for a second position in the received signal, wherein the second position is offset from the first position by a number of symbol periods, and wherein the second filter sequence contains a contiguous sub-sequence of the first filter sequence, offset within the second filter sequence, relative to the position of the sub-sequence within the first filter sequence, by said number of symbol periods.

\* \* \* \* \*